(12) United States Patent
Karpinsky et al.

(10) Patent No.: US 11,679,941 B1
(45) Date of Patent: Jun. 20, 2023

(54) CONVEYOR SYSTEM WITH COLLECTION OF EXCESS COATING FROM CONVEYED FOOD PRODUCTS

(71) Applicant: Vibratory Solutions, LLC, Lodi, WI (US)

(72) Inventors: James L. Karpinsky, Madison, WI (US); Joshua C. Friede, Madison, WI (US); Brian J. Gilbertson, Columbus, WI (US); Scott J. Rose, Columbus, WI (US); James M. Bakos, Gig Harbor, WA (US)

(73) Assignee: Vibratory Solutions. LLC, Lodi, WI (US)

( * ) Notice: Subject to any disclaimer, the term of this patent is extended or adjusted under 35 U.S.C. 154(b) by 0 days.

(21) Appl. No.: 17/479,049

(22) Filed: Sep. 20, 2021

Related U.S. Application Data

(63) Continuation of application No. 16/859,185, filed on Apr. 27, 2020, now Pat. No. 11,142,409.

(60) Provisional application No. 63/179,737, filed on Apr. 26, 2021.

(51) Int. Cl.
*B65G 47/74* (2006.01)
*B65G 27/08* (2006.01)
*B65G 27/04* (2006.01)
*B65G 27/34* (2006.01)

(52) U.S. Cl.
CPC ............. *B65G 47/74* (2013.01); *B65G 27/04* (2013.01); *B65G 27/08* (2013.01)

(58) Field of Classification Search
None
See application file for complete search history.

(56) References Cited

U.S. PATENT DOCUMENTS

| | | | |
|---|---|---|---|
| 3,547,075 A | 12/1970 | Johnson | |
| 3,642,133 A * | 2/1972 | Venanzetti | B07B 1/284 209/314 |
| 3,860,105 A | 1/1975 | Johnson | |
| 3,929,221 A | 12/1975 | Armstrong | |
| 4,058,083 A | 11/1977 | Miller | |
| 4,082,657 A * | 4/1978 | Gage | B07B 1/48 209/311 |
| 4,351,850 A | 9/1982 | Costamagna et al. | |
| 4,496,084 A | 1/1985 | Booth et al. | |
| 5,037,536 A | 8/1991 | Koch et al. | |
| 5,232,099 A * | 8/1993 | Maynard | B07B 1/42 209/276 |
| 5,238,303 A | 8/1993 | Dixon | |
| 5,314,056 A | 5/1994 | Davis et al. | |

(Continued)

*Primary Examiner* — Kavel Singh
(74) *Attorney, Agent, or Firm* — Craig Fieschko; DeWitt LLP

(57) ABSTRACT

A vibratory conveyor system includes a product transfer pan linked to a shaker base via spring arms. Vibration transferred from the shaker base to the spring arms causes the product transfer pan to oscillate and convey products across the product transfer pan. The product transfer pan has apertures defined therein, such that excess coatings on (or fallen from) the conveyed products tend to fall through the apertures. A chute situated beneath the apertures collects the fallen coatings, and preferably diverts it to a side of the conveyor for collection and subsequent reuse or disposal. The chute is preferably linked to the product transfer pan such that the chute and pan oscillate in tandem.

20 Claims, 6 Drawing Sheets

(56) References Cited

U.S. PATENT DOCUMENTS

| | | |
|---|---|---|
| 5,437,723 A | 8/1995 | Sollich |
| 5,555,967 A | 9/1996 | Hufford |
| 5,746,322 A * | 5/1998 | LaVeine ................ B07B 1/12 |
| | | 209/393 |
| 6,276,518 B1 | 8/2001 | Wierman |
| 6,286,658 B1 | 9/2001 | Hufford |
| 6,308,822 B1 | 10/2001 | Moran et al. |
| 6,406,680 B1 | 6/2002 | Priebe |
| 6,505,547 B1 | 1/2003 | Burnett et al. |
| 6,655,523 B2 | 12/2003 | Jones et al. |
| 6,868,960 B2 | 3/2005 | Jones |
| 7,475,767 B2 | 1/2009 | Crawford et al. |
| 7,703,411 B1 | 4/2010 | Bakos et al. |
| 7,757,836 B2 | 7/2010 | Karpinsky et al. |
| 7,775,343 B2 | 8/2010 | Kemph et al. |
| 7,842,896 B1 | 11/2010 | Calcoen et al. |
| 7,874,081 B2 | 1/2011 | Ewen |
| 8,181,592 B2 | 5/2012 | Karpinsky et al. |
| 8,283,589 B2 | 10/2012 | Janssens et al. |
| 8,359,995 B2 | 1/2013 | Bakos et al. |
| 8,517,168 B2 | 8/2013 | Hufford |
| 8,561,805 B2 * | 10/2013 | Scott ................ E21B 21/065 |
| | | 209/555 |
| 8,708,153 B2 | 4/2014 | Hufford et al. |
| 8,714,362 B2 | 5/2014 | Jones et al. |
| 8,733,540 B2 | 5/2014 | Woiler et al. |
| 8,789,706 B2 * | 7/2014 | Pandraud ............. B65G 27/02 |
| | | 209/920 |
| 9,126,765 B2 | 9/2015 | Groenewald et al. |
| 9,132,966 B1 | 9/2015 | Groenewald et al. |
| 9,181,037 B1 | 11/2015 | Tomlinson et al. |
| 9,254,965 B2 | 2/2016 | Groenewald |
| 9,277,754 B2 | 3/2016 | Karpinsky et al. |
| 9,370,197 B1 | 6/2016 | Karpinsky et al. |
| 9,408,283 B2 | 8/2016 | Jones et al. |
| 9,415,941 B2 | 8/2016 | Woiler et al. |
| 9,463,935 B2 | 10/2016 | Karpinsky et al. |
| 9,481,525 B1 | 11/2016 | Dunham et al. |
| 9,481,526 B1 | 11/2016 | Groenewald |
| 9,635,880 B2 | 5/2017 | Bakos et al. |
| 9,776,805 B2 | 10/2017 | Groenewald |
| 9,889,993 B2 | 2/2018 | Abbas et al. |
| 10,011,426 B1 | 7/2018 | Karpinsky et al. |
| 10,815,064 B1 | 10/2020 | Ahmed |
| 11,089,810 B2 | 8/2021 | Karpinsky et al. |
| 2013/0146512 A1 | 6/2013 | Reynolds et al. |

* cited by examiner

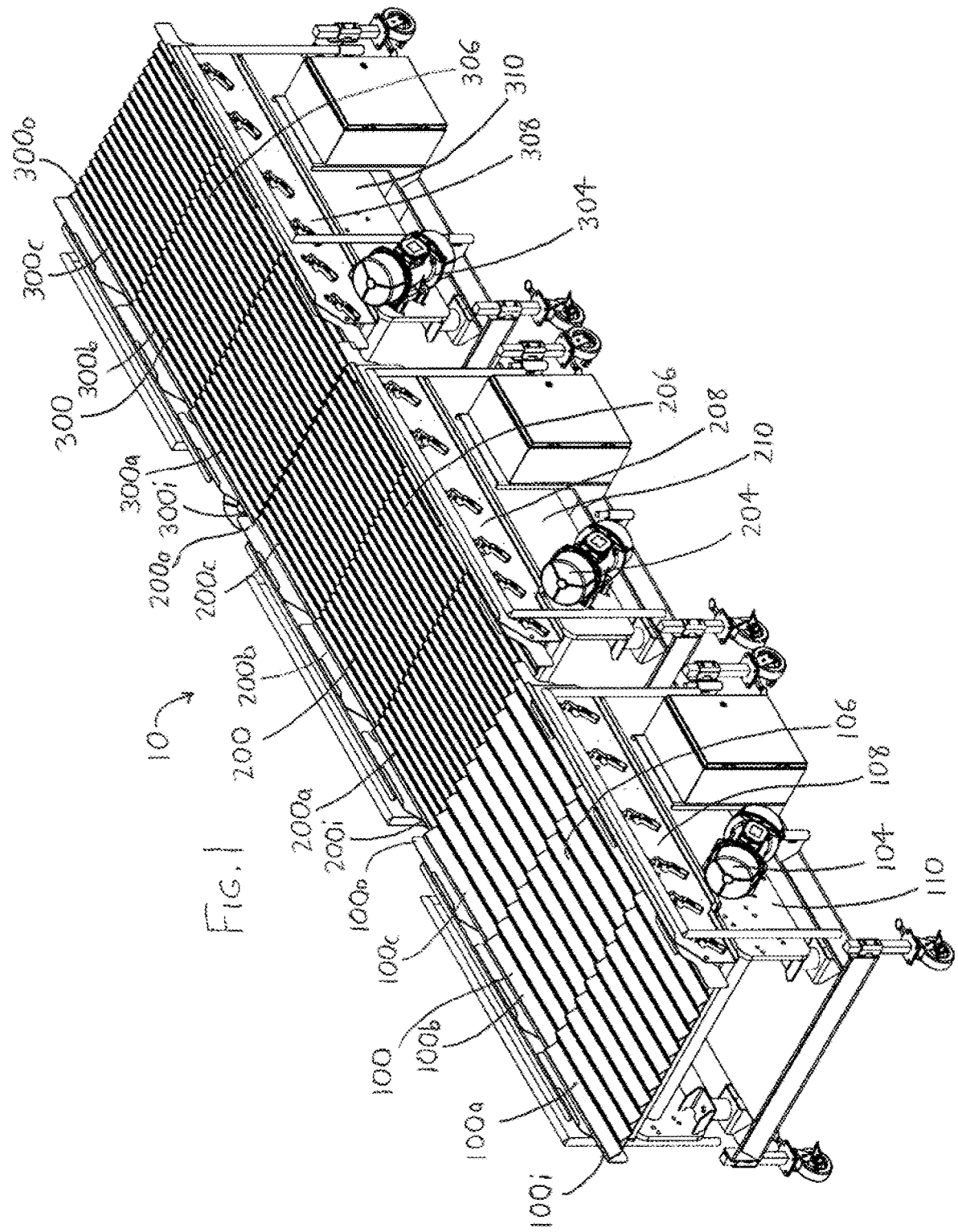

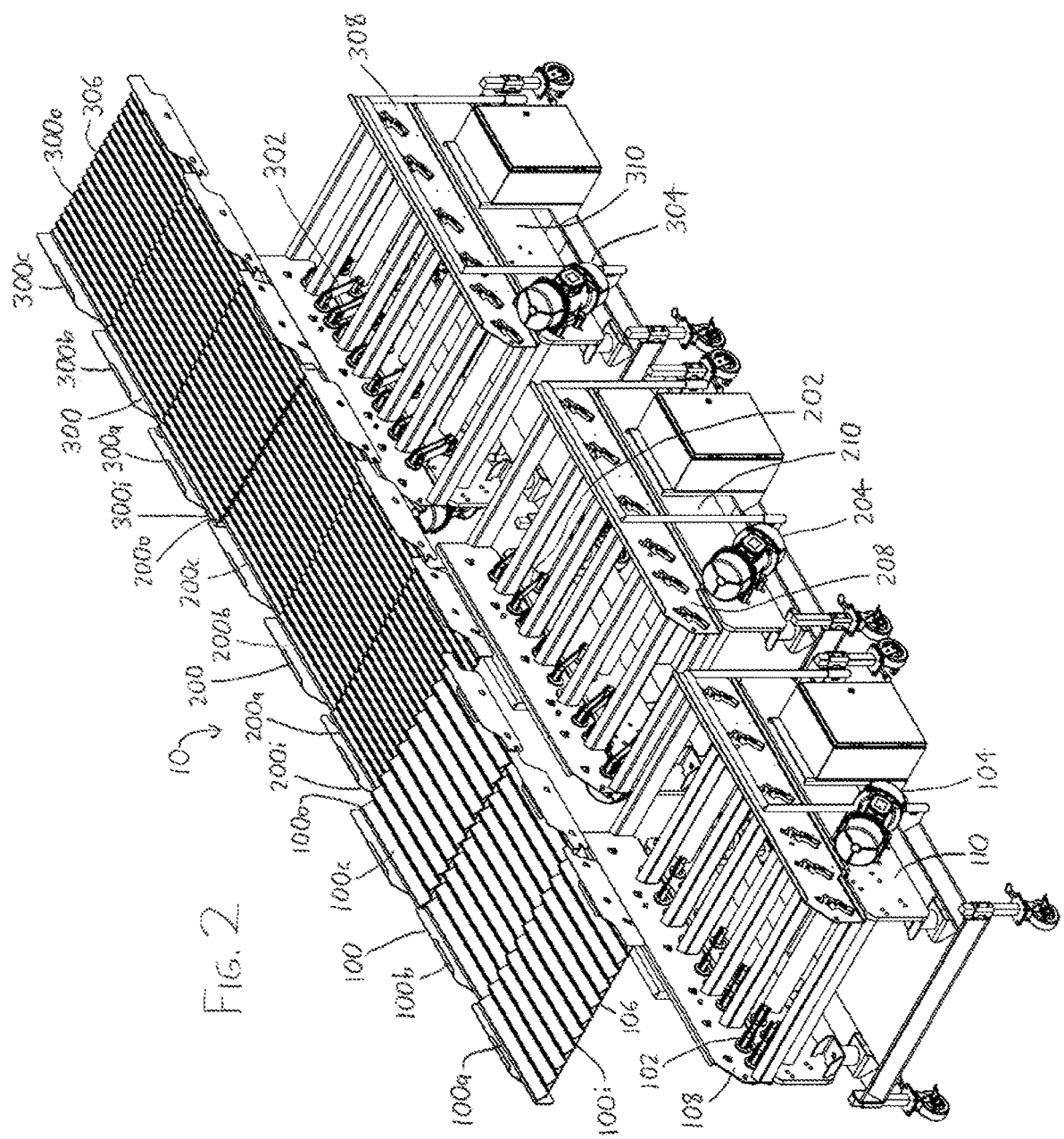

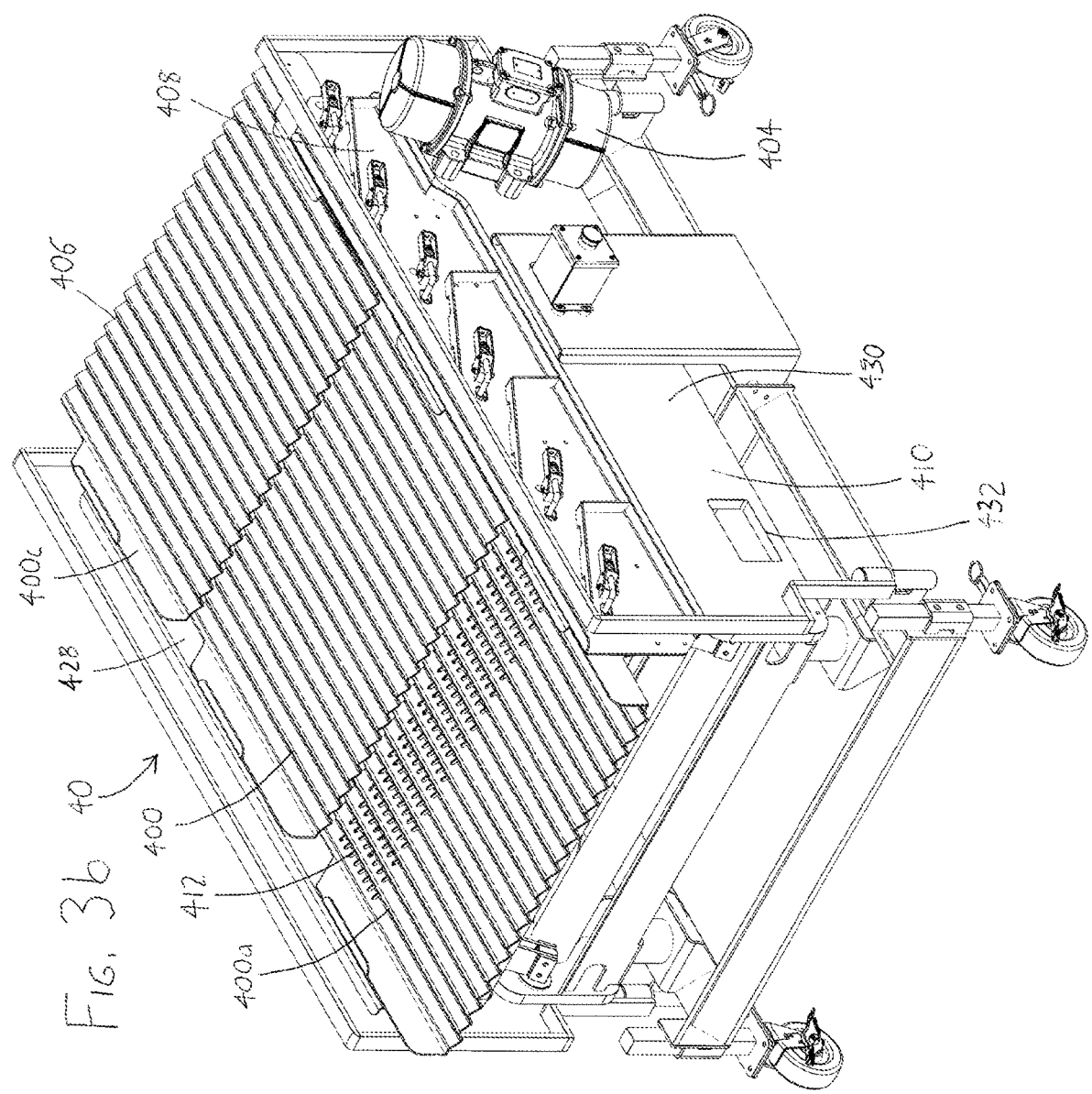

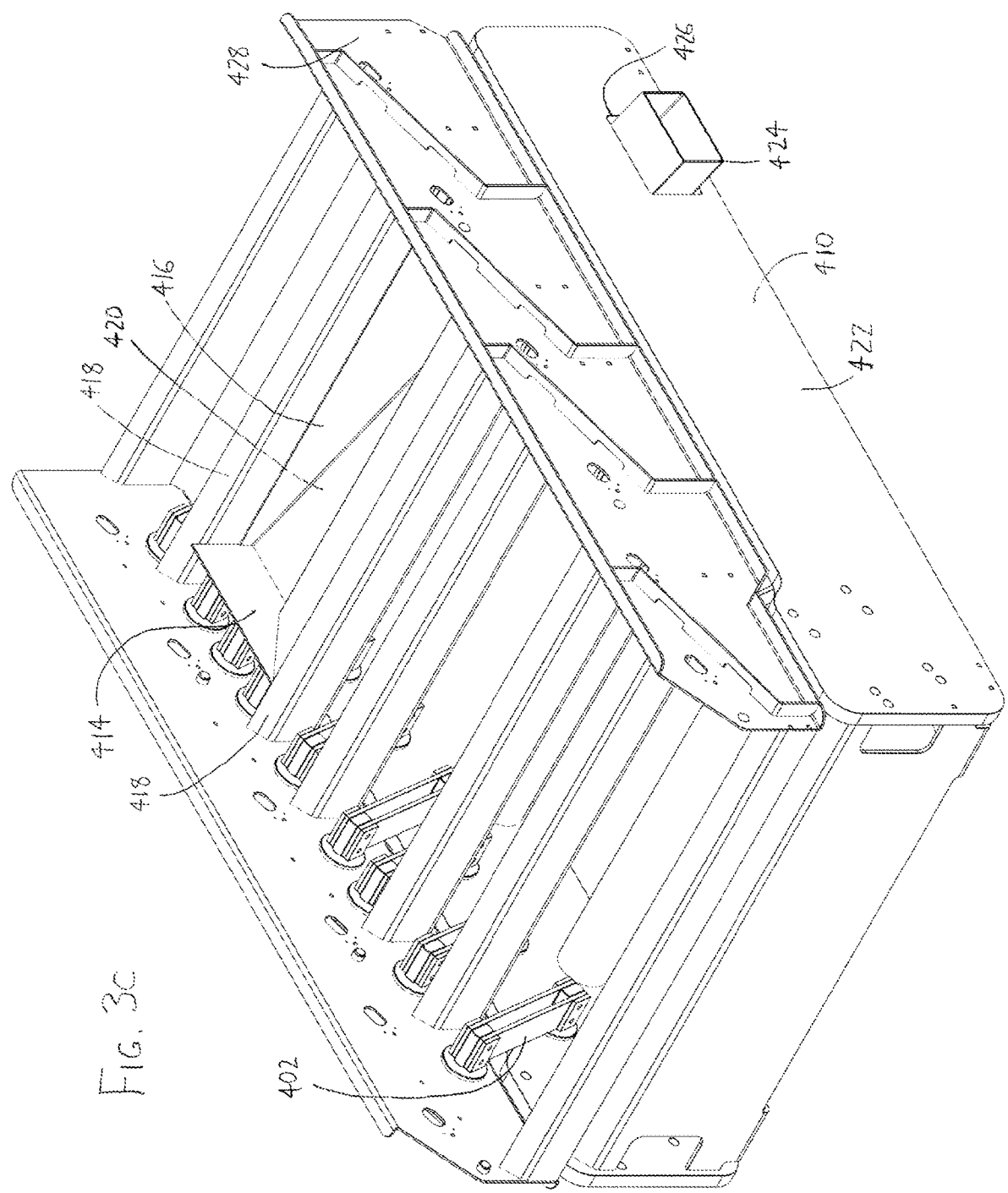

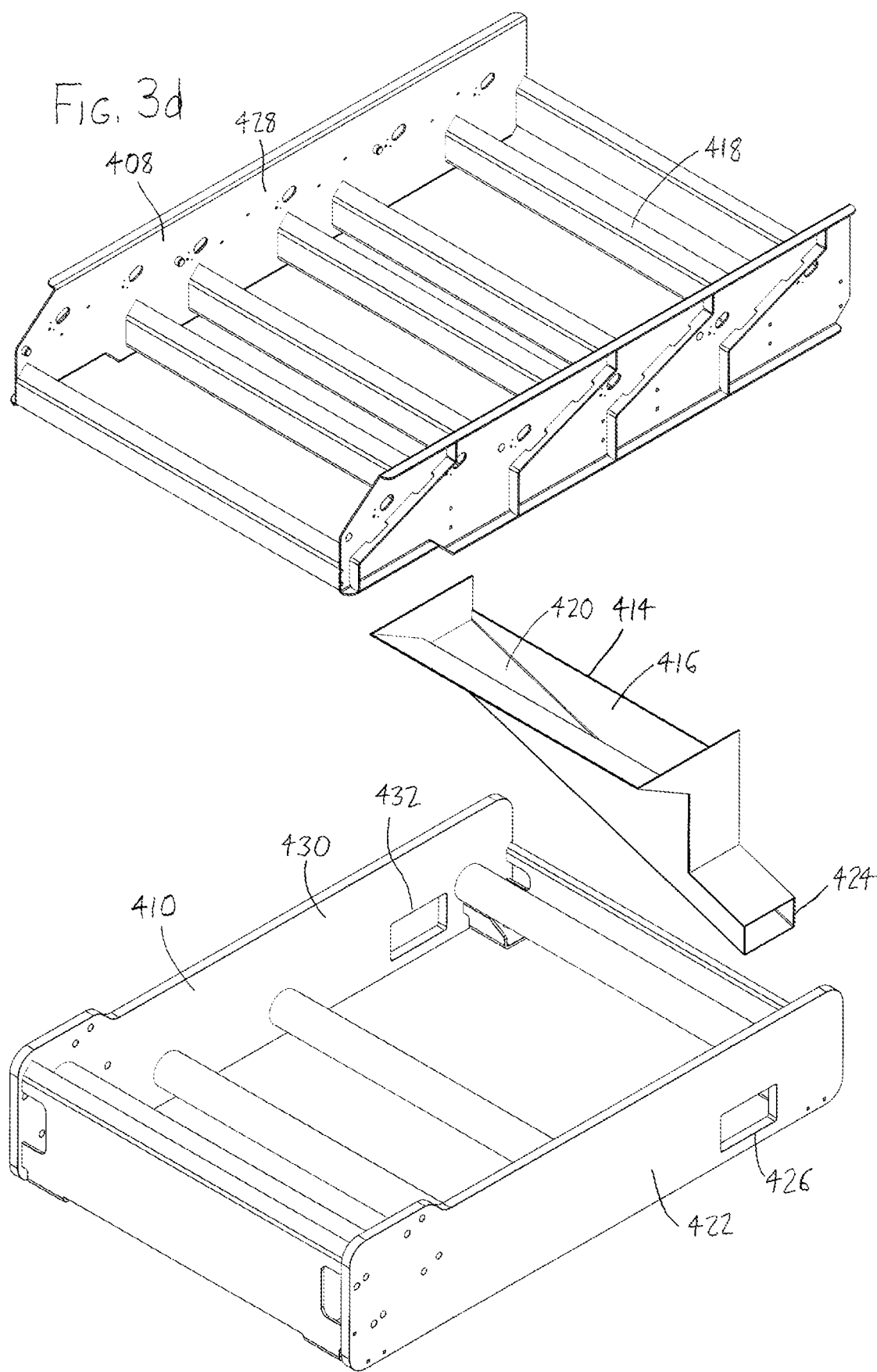

US 11,679,941 B1

CONVEYOR SYSTEM WITH COLLECTION OF EXCESS COATING FROM CONVEYED FOOD PRODUCTS

FIELD OF THE INVENTION

This document concerns an invention relating generally to automated orientation of food products, particularly malleable/reshapable food products such as chicken cutlets, during processing so that the products have identical (or at least more similar) alignment. The invention also relates generally to collection of excess coatings (batter, bread crumbs, etc.) from coated food products.

BACKGROUND OF THE INVENTION

Automated preparation and packaging of food products which are malleable—such as battered/breaded fish fillets and poultry cutlets—is challenging. For uniform treatment and ease of processing, the products are ideally spaced apart and uniformly oriented as they travel through processing equipment, for example, so that all products are oriented with lengths parallel to the direction of travel through the processing equipment. Methods used to uniformly orient other types of food products are largely unsuitable because malleable food products can have nonuniform shapes, are reshapeable, and are prone to sticking to each other and/or to processing equipment. Additional complications arise where the processing of these products involves steps that further randomize their orientation. As an example, a popular form of chicken product is a "family style" or "country style" cutlet which has a coarse and heavy particulate coating on the cutlet (the coating being in the nature of coarse breadcrumbs or cracker crumbles). The coating is typically applied by tumbling the cutlets within a rotating drum containing the coating particles, with the cutlets being lifted, dropped, and rolled within the drum (and in and on the coating particles within the drum). The coated cutlets are then discharged from the drum for further processing (e.g., further coating, frying, freezing, and/or packaging). To reduce production difficulties (in particular, unsuitable "reject" cutlets), the coated cutlets are ideally spaced and uniformly oriented during such further processing. However, the tumbling process negates any uniformity, with the cutlets exiting the drum in random orientations (and possibly being stuck in folded states, or being stuck to other cutlets). As a result, personnel are often required to monitor, unstick, and orient the cutlets for further processing. While this reduces or eliminates product rejects, it tends to increase production costs.

Coated food products also cause additional burdens with clean-up and waste. Some food products may be processed by transferring them between processing stations which apply successive layers of coating (flour, batter, breading such as bread crumbs or panko, texturizers such as cornflakes or sunflower seeds, spices/seasoning, etc.) to add flavor, improve mouth feel, and increase the weight of the resulting food product, which may then be par-cooked prior to packaging and freezing. Excess coating applied at one processing station can be carried to the next station with negative effect: the excess coating may fall from the production line, leading to waste and clean-up burdens, or it may be carried to later stations and interfere with their operations (e.g., the excess coating can contaminate batter at batter application stations, and contaminate oil at frying stations, leading to more rapid degeneration of batter/oil).

SUMMARY OF THE INVENTION

The invention involves a conveyor system which is intended to at least partially address the aforementioned problems. To give the reader a basic understanding of some of the advantageous features of the invention, following is a brief summary of preferred versions of the conveyor system, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

The accompanying FIGS. 1-2 illustrate a conveyor system 1000 exemplifying the invention. The conveyor system 1000 includes several conveyors 10, 20, and 30 arrayed in series, each having a respective product transfer pan 100/200/300 linked by respective elongated spring arms 102/202/302 (FIG. 2) to a respective shaker motor 104/204/304. (Each product transfer 100/200/300 pan here includes three pan sections, respectively 100*a*, 100*b*, 100*c*; 200*a*, 200*b*, 200*c*; and 300*a*, 300*b*, 300*c*. As discussed below, each product transfer pan may include fewer or more pan sections.) The shaker motors 104/204/304, which may be conventional rotary electric motors whose shafts bear rotating imbalances, impart vibration to the spring arms 102/202/302 such that their lengths vibrate, causing the spring arm ends linked to the transfer pans 100/200/300 to vibrate along directions perpendicular to the spring arm lengths. The product transfer pans 100/200/300 therefore likewise vibrate, with their movement having both a horizontal component (moving along a vibration distance oriented along the length of the conveyor system 1000) and a vertical component (moving along a vibration height oriented perpendicular to the length of the conveyor system 1000). Product placed on the product transfer pans 100/200/300 is then conveyed along a product throughput path across the pans 100/200/300 in a "bouncing" motion by this vibration (primarily by its horizontal component), as well as by any inclination of the product transfer pans 100/200/300. Each product transfer pan 100/200/300 extends between a pan input end 100*i*/200*i*/300*i* and a pan output end 100*o*/200*o*/300*o*, wherein each pan input end is situated to receive product from the pan output end of any prior product transfer pan in the series (as by having each pan's output end situated above and overhanging the input end of any succeeding pan). Thus, product deposited (e.g., from a drum coater) at a conveyor input end (at 100*i* on the first product transfer pan 100) is conveyed along the first pan 100 to be deposited onto the second pan 200, then conveyed along the second pan 200 to be deposited on the third pan 300, and then conveyed along the third pan 300 to a conveyor output end (at 300*o*) to be received by subsequent processing equipment.

Each product transfer pan 100/200/300 includes product channels 106/206/306 depressed therein, with the product channels extending between the pan input end 100*i*/200*i*/300*i* and the pan output end 100*o*/200*o*/300*o*. In the depicted exemplary conveyor system 1000, the product transfer pans 100/200/300 are corrugated, having V-shaped channels 106/

206/306 with inclined walls. As product is conveyed along each pan 100/200/300 by the vibration, over time, the vibration tends to settle products into the channels 106/206/306 with the lengths of the products aligned along the lengths of the channels. The products may be given more residence time on each product transfer pan 100/200/300, and thus more time to settle into the channels 106/206/306, if the pans 100/200/300 (and/or the pan sections 100a, 100b, 100c/200a, 200b, 200c/300a, 300b, 300c therein) slope upwardly between their pan input ends 100i/200i/300i and their pan output ends 100o/200o/300o, whereby each pan's output end is higher than its input end. The product is additionally spread across the width of the conveyor system 1000 as it travels along the conveyor system 1000 by providing successive product transfer pans 100/200/300 with greater numbers of channels 106/206/306; for example, the second product transfer pan 200 of the exemplary conveyor system 1000 is provided with twice as many channels 206 as the first product transfer pan 100, whereby products traveling down a channel 106 of the first pan 100 tend to be distributed between the succeeding two channels 206 of the second pan 200.

In this arrangement, some products may still fail to align their lengths along the lengths of the channels 106/206/306. For example, a chicken cutlet deposited on the input end 100i of the first product transfer pan 100 with its length oriented perpendicular to the channels 106 may sag into two or more adjacent channels 106, resisting alignment as it travels along the conveyor system 1000. This problem can be reduced, and more uniform product alignment can be achieved, if each succeeding product transfer pan in the series has one or more of:

(1) A vibration distance (that is, the amount of oscillation along the direction of product travel) greater than the vibration distance of the prior product transfer pan in the series. This feature can be provided by having the spring arms 102/202/302 (FIG. 2) of each successive product transfer pan 100/200/300 aligned at a lesser angle to a vertical plane than the prior product transfer pan, thereby increasing the vibration distance (the horizontal component of vibratory movement) and decreasing the vibration height (the vertical component of the vibratory movement) in successive pans 100/200/300.

(2) A vibration frequency greater than the vibration frequency of the prior product transfer pans in the series 100/200/300. This feature can be provided by having the shaker motor 104/204/304 of each successive product transfer pan 100/200/300 operate at a greater speed than the shaker motor 104/204/304 of the prior product transfer pan 100/200/300 in the series.

By having a succeeding product transfer pan 100/200/300 vibrate with a greater vibration distance than the prior pan 100/200/300, and/or with a greater vibration frequency than the prior pan 100/200/300, the succeeding pan 100/200/300 accelerates products as they transition from the prior pan 100/200/300 to the succeeding pan 100/200/300. The portion of each product that initially falls on the succeeding pan 100/200/300 is therefore more forcefully thrust forwardly than the trailing portion of the product, an effect which tends to pull products so that their lengths are oriented more parallel to the channels 106/206/306.

By providing a conveyor system 1000 having two or more product transfer pans 100/200/300 (and preferably three or more product transfer pans 100/200/300) as described above, products tend to have their lengths orient more parallel to the product travel direction (along the length of the conveyor system 1000) as they travel along and between the product transfer pans 100/200/300. The products then leave the final product transfer pan 300 with the same (or at least similar) orientations, and with greater lateral distribution spread across the width of the final product transfer pan 300 than on the first product transfer pan 100, for further processing on any subsequent processing equipment.

FIGS. 3a-3d then illustrate a conveyor 40 which might be produced by modifying any one of conveyors 10/20/30, and which is useful when the conveyor system is used to transport coated food products (in which case the conveyor 40 might be used in place of any one or more of the conveyors 10/20/30). As with the conveyors 10/20/30, the conveyor 40 includes a shaker base 410 bearing a shaker motor 404, with spring arms 402 transmitting vibration from the shaker base 410 to a frame 408 (and to a product transfer pan 400 thereon, shown with three pan sections 400a/400b/400c). Thus, products deposited at or adjacent the conveyor input end at 400a travel along a product throughput path atop the product transfer pan 400 toward the conveyor output end at 400c. However, the product transfer pan 400 (here its pan section 400c) includes apertures 412 defined therein (preferably at the bottoms of the channels 406), whereby excess coating from products traveling atop the product transfer pan 400 falls through the apertures 412. As seen in FIG. 3c, wherein the product transfer pan 400 is removed from the frame 408 (and in FIG. 3d, showing the arrangement of FIG. 3c disassembled), a chute 414 is affixed to the frame 408 below the apertures 412, whereby the chute 414 receives the excess coating falling through the apertures 412. The chute 414 includes opposing chute sidewalls 416 which are affixed to reinforcing struts 418 on the frame 408, and a bottom chute wall 420 which slopes downwardly toward one of the shaker base sides 422 to terminate in a chute output end 424 (here defined by a duct). The chute 414 descends from the frame 408 into the interior of the shaker base 410, with its chute output end 424 extending into a passage 426 defined in the shaker base 410 (and preferably through the passage 426 to protrude outwardly from the conveyor 40 past the shaker base 410).

With this arrangement, as products are conveyed along the product throughput path atop the product transfer pan 400, excess coating tends to be shaken from the products to collect and travel within the channels 406. This excess coating then falls through the apertures 412 and into the chute 414, where it slides toward the chute output end 424 (such sliding being assisted by the vibration of the chute 414, with tends to deter the coating from sticking to the chute 414). A receptacle placed beneath the chute output end 424 can then collect the excess coating for recycling (i.e., reintroduction at the coating application station of the production line) or for disposal. To prevent interference between the chute output end 424 and the shaker base 410, the passage 426 is sized with clearance such that the chute output end 424 can vibrate within the passage without striking the shaker base 410.

Further potential advantages, features, and objectives of the invention will be apparent from the remainder of this document in conjunction with the associated drawings.

BRIEF DESCRIPTION OF THE DRAWINGS

FIG. 1 is a perspective view of a conveyor system 1000 exemplifying the invention, having three conveyors 10/20/30 with respective product transfer pans 100/200/300.

FIG. 2 is a partially exploded (disassembled) view of the conveyor system 1000 of FIG. 1, showing the product transfer pans 100/200/300 lifted from their frames 108/208/

Figure 3A:
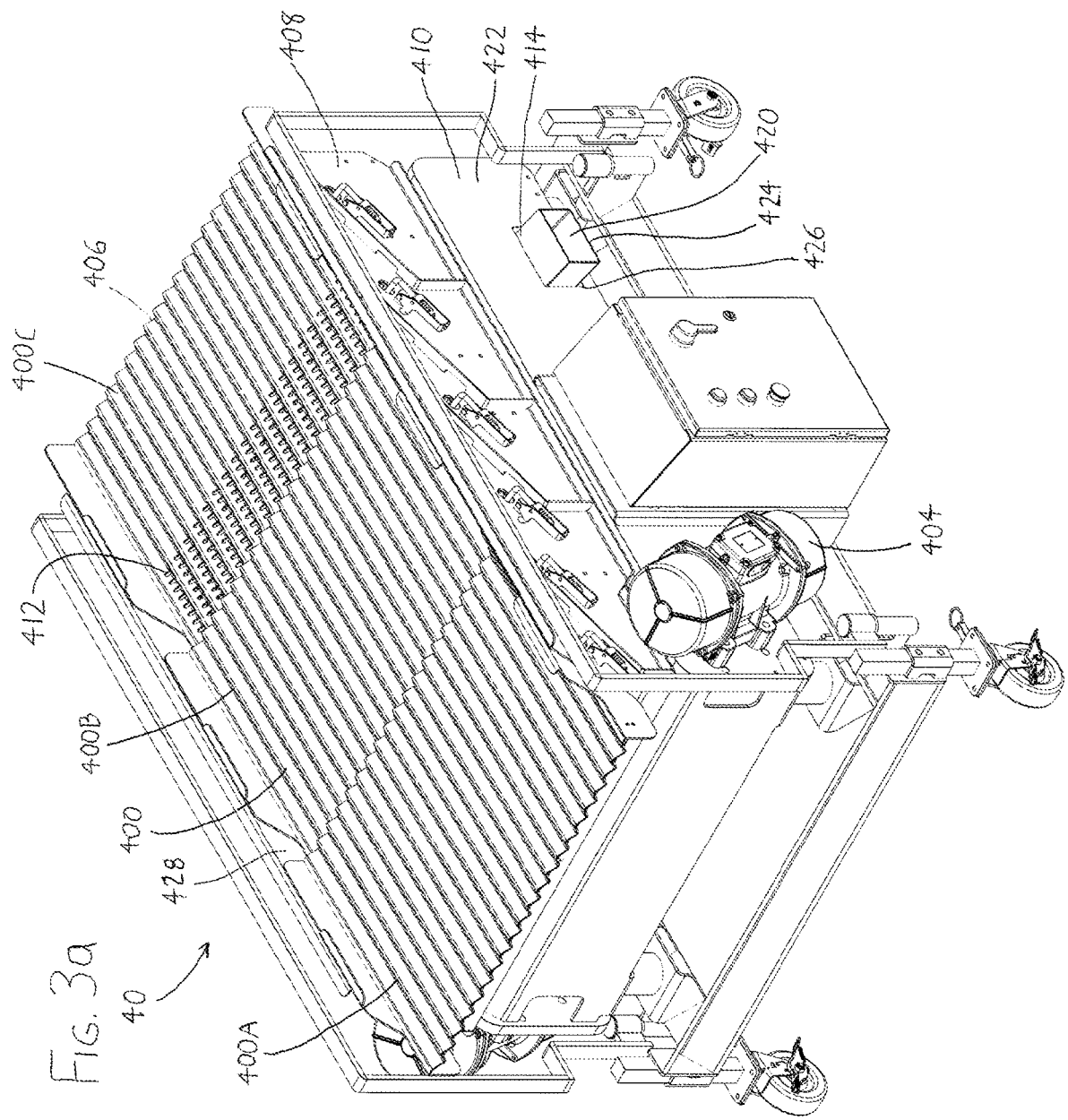

308, and showing the elongated spring arms 102/202/302 linking each frame 108/208/308 to a respective shaker base 110/210/310 bearing a shaker motor 104/204/304.

FIG. 3a is a perspective view of an exemplary alternative conveyor 40 that might be used in place of one or more of the conveyors 10/20/30 of FIG. 1.

FIG. 3b is a perspective view of the opposite side of the conveyor 40 shown in FIG. 3a.

FIG. 3c is a partial view of the conveyor 40 of FIGS. 3a-3b, showing its frame 408, shaker base 410, spring arms 402, and chute 414, with other components (such as the product transfer pan 400 of FIGS. 3a-3b) removed.

FIG. 3d is an exploded (disassembled) view of the frame 408, shaker base 410, and chute 414 of FIG. 3c.

DETAILED DESCRIPTION OF EXEMPLARY VERSIONS OF THE INVENTION

Expanding on the foregoing discussion, each of the product transport pans 100/200/300 of the conveyor system 1000 has relatively light weight, and can be formed of corrugated sheet metal or plastic (with stainless steel being preferred for food processing applications). Each product transfer pan 100/200/300 is mounted in a respective frame 108/208/308 having sides which rise above the product transfer pan 100/200/300, with the frame 108/208/308 being resiliently linked by spring arms 102/202/302 (FIG. 2, e.g., leaf/beam springs) to a relatively heavy shaker base 110/210/310 bearing the shaker motor 104/204/304. As the shaker motor 104/204/304 vibrates the shaker base 110/210/310, the vibration is transmitted to its product transport pan 100/200/300 via the intervening spring arms 102/202/302, which sway about their lengths, and thus provide "thrust" to their frames 108/208/308 (and the product transfer pans 100/200/300 thereon) along vectors oriented perpendicular to their lengths. A product situated on a product transport pan 100/200/300 essentially "bounces" across the pan in accordance with the thrust imparted to the pan, and any inclination of the pan. Examples of conveyor systems of this nature can be found in U.S. Pat. No. 7,703,411 to Bakos et al.; U.S. Pat. No. 7,757,836 to Karpinsky et al.; U.S. Pat. No. 8,181,592 to Karpinsky et al.; U.S. Pat. No. 8,359,995 to Bakos et al.; U.S. Pat. No. 9,277,754 to Karpinsky et al.; U.S. Pat. No. 9,370,197 to Karpinsky et al.; U.S. Pat. No. 9,463,935 to Karpinsky et al.; U.S. Pat. No. 9,635,880 to Bakos et al.; U.S. Pat. No. 10,011,426 to Karpinsky et al.; and U.S. Patent Appl'n. Publ'n. 2019/0328028 to Karpinsky et al., as well as the patents cited in (and patents citing to) these references, all of which are incorporated by reference herein such that their contents should be regarded as a part of this document.

As seen in FIG. 2, as the series of product transport pans 100/200/300 progresses from the first pan 100 to the final pan 300, the angles of their spring arms 102/202/302 gradually transition to more vertical orientations, thereby imparting less vertical thrust and motion, and greater horizontal thrust and motion, to the pans 100/200/300. Product entering the first pan 100 will therefore experience greater vertical "bounce," being tossed more forcefully upwardly than on later pans 200 and 300, assisting the product with settling its length within a channel 106. However, the alignment of the products within channels 106 may be "coarse," given the force of the vertical vibration. In subsequent pans 200 and 300, the decreasing vertical thrust/motion has lesser tendency to lift the products from the floor/walls of the channels 206 and 306, tending to more finely align the products lengthwise within the channels 206 and 306 as they settle therein. Moreover, any products that remain straddled across adjacent channels 106 and 206 tend to be dislodged when transitioning between pans 100/200/300, as the products will experience sudden acceleration. This inter-pan acceleration is enhanced by increasing the vibratory frequency/speed of successive pans 100/200/300. A conveyor system such as the one shown in FIGS. 1-2 might use the following arrangement where products such as chicken cutlets are being processed:

| Length of each product transport pan 100/200/300: 5-10 feet | | |
|---|---|---|
| Product Transport Pan | Frequency/ Speed (RPM) | Spring Arm Angle (from vertical) |
| 100 | 910 | 45 degrees |
| 200 | 925 | 33 degrees |
| 300 | 950 | 22.5 degrees |

The shaker motor 104/204/304 frequency/speed might be increased (or decreased) by as much as 50 RPM, and arm angle might be increased (or decreased) by as much as 5 degrees. However, these ranges are merely exemplary, and other speeds/angles could be used, particularly for different products having different weights, sizes/configurations, plasticity/malleability, and stickiness. It is not necessary that all product transport pans in a series have successively decreasing arm angle (with respect to vertical), increasing vibration distance (i.e., increased thrust along the direction of product travel), and/or increasing vibration frequency/speed; one or more of these characteristics might be maintained unchanged from one product transport pan to the next.

The channels 306 of the final product transport pan 300 are preferably sized at least as large as the nominal width of the product being processed, with each prior transport pan 100 and 200 having the same or fewer channels 106 and 206. The number of channels of the prior pan are preferably an integer divisor of the number of channels of the later pan, e.g., one-half or one-third the number of channels of the later pan, such that products traveling down the channels of the preceding pan are separated/spread into two or more channels in the succeeding pan. Pans 100/200/300 need not have the simple corrugated forms exemplified by the pans 100/200/300, and could have features such as those shown in the patents noted earlier in this document, such as diverging fan-shaped slides (as in U.S. Pat. No. 9,370,197) or diverging channels for spreading products, or conversely converging fan-shaped troughs or converging channels for concentrating product flow (as may be useful at the final product transport pan 300 to concentrate product for receipt on a narrower product throughput path on subsequent processing equipment); vanes, wedges, deflectors, or other shapes which protrude from the pan surfaces to spread or otherwise direct products (as in U.S. Pat. No. 9,463,935); perforations/apertures in pan surfaces (for example, to receive excess particulate or liquid coating material); and/or "stairstepped" pan surfaces for tumbling products (as in U.S. Patent Appl'n. Publ'n. 2019/0328028). Pans 100/200/300 are preferably removably attached to their frames 108/208/308, as by bolts or other fasteners that can be adjusted by tool or by hand, so that pans 100/200/300 can be easily removed from their frames 108/208/308 for easy cleaning, and/or for easy reconfiguration of the conveyor system 1000 to accommodate different types of products.

As illustrated by the product transport pans 100/200/300, pans may be provided in multiple pan sections 100a/100b/100c, 200a/200b/200c, and 300a/300b/300c arrayed along the product travel direction (and/or arrayed across the width of the conveyor system 1000). Throughout this document, a "product transport pan" can be regarded as containing one or more pan sections, all of which vibrate as a unit. While the product transport pans 100/200/300 of the exemplary conveyor system 1000 are depicted as each having identically sized and configured pan sections 100*a*/100*b*/100*c*, 200*a*/200*b*/200*c*, and 300*a*/300*b*/300*c*, the pan sections need not be identically sized or configured. The depicted pan sections 100*a*/100*b*/100*c*, 200*a*/200*b*/200*c*, and 300*a*/300*b*/300*c* are each shown as sloping upwardly between their pan section input ends and their pan section output ends, situating each pan's output end higher than its input end, to slow product travel and allow more time for product alignment within each section's channels. The output ends of the pan sections slightly overhang the pan section input ends of the succeeding pan sections, such that products within a channel of one pan section are passed into the corresponding channel(s) of the succeeding pan section.

Each shaker base 110/210/310 for a product transport pan 100/200/300 can individually mobile (as by bearing lockable casters for ease of portability), or two or more shaker bases 110/210/310 can be provided as a mobile or immobile unit. One or more of the shaker bases 110/210/310 and their product transfer pans 100/200/300 could be incorporated into other processing equipment.

FIGS. 3*a*-3*b* then illustrate a conveyor 40 which is configured for recovery of excess coatings, and which may be used in place of any one or more of the conveyors 10/20/30 of FIGS. 1-2 (i.e., it may be placed in line with any one or more of the conveyors 10/20/30, or may be used independently along a production line). The conveyor 40 has the same construction and operation as the conveyors 10/20/30, save for the inclusion of the apertures 412 in the product transfer pan 400 (more particularly in its pan section 400*c*), and the inclusion of the chute 414 (as well as the chute passage 426 in the shaker base 410). As discussed previously, excess food product coatings—either those that are "loose" (unadhered to food products), or those that are not fully adhered to the food products—fall through the apertures 412 as food products travel across the product transfer pan 400, and are captured by the chute 414 for collection at the chute output end 424. The excess coatings may then be recycled or discarded.

The apertures 412 are preferably situated at or near the conveyor output end (the end of the final pan section 400*c*), as removal of excess coating exposes the underlying coating layer(s) on the food products. Such exposure may degrade certain coatings if they are then subjected to excessive subsequent contact; for example, panko flakes may break if they experience too much contact with the vibrating product transfer pan 400, affecting the texture of the finished food product. Apertures 412 can be sized to optimize capture of the coating(s) in question, with larger apertures 412 (or apertures which are longer along the product travel direction) being useful for coating particles having greater size/mass, as these particles might otherwise "bounce" over a smaller aperture 412. Likewise, apertures 412 can be shaped and placed to optimize coating capture, with round/oval, polygonal, or other shapes (chevron, cruciform, etc.) being placed at the bottoms or sides of channels 406 in the product transfer pan 400. Different product transfer pans 400 (or pan sections 400*a*/400*b*/400*c*) can be provided with different sizes, shapes, and/or placements of apertures 412 such that appropriate pans/sections can be swapped into the conveyor 40 to accommodate whatever food products are being processed during a particular production period.

The chute 414 (see particularly FIGS. 3*c*-3*d*) is configured to attach to the frame 408, e.g., to the frame's reinforcing struts 418 and/or to its sidewalls 428, such that it vibrates with the frame 408, thereby deterring the excess coating from sticking to the chute sidewalls 416 and floor 420 as it slides down the inclined floor 420 to the chute output end 424. The chute passage 426 in the shaker base side 422 is sized to accommodate the vibration of the chute output end 424 therein; as the frame 408 typically has horizontal and vertical displacement of no more than 1.25 cm or so, it is typically sufficient to size the chute passage 426 to fit the chute output end 424 with no more than approximately 3 cm of clearance on all sides. The opposite shaker base side 430 (FIG. 3*b*) preferably also bears an alternate chute passage 432 configured to receive the chute output end 424 therein if a user should choose to install a chute 414 to discharge excess coating from the side of the conveyor 40 opposite the one shown in FIG. 3*a*.

The configuration of the depicted chute 414 is merely exemplary, and other configurations may be used; for example, as depicted, the chute 414 does not extend across the full width of the product transfer pan 400 between the frame sidewalls 428, but it could be made to have protruding platforms/trays which extend above the spring arms 402 to catch excess coating falling from apertures 412 above these regions. The chute 414 could be configured to discharge excess coating at locations other than the side of the conveyor 40 shown in FIG. 3*a* (e.g., at the conveyor output end), or could simply be configured as a bin in which the excess coating is collected, but discharge at the side of the conveyor 40 is preferred for ease of collection of the coating. The chute 414 could alternatively be affixed to, or could simply rest within, the shaker base 410, such that it does not vibrate with the frame 408, but such an arrangement may tend to scatter coating outside the chute 414, and additionally coating may tend to clump within a chute 414 having low or no vibration.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims. In these to claims, no element therein should be interpreted as a "means-plus-function" element or a "step-plus-function" element pursuant to 35 U.S.C. §112(f) unless the words "means for" or "step for" are explicitly used in the particular element in question.

What is claimed is:

1. A conveyor including:
   a. a product transfer pan:
      (1) situated between a conveyor input end and a conveyor output end, whereby products travel along a product throughput path atop the product transfer pan from the conveyor input end toward the conveyor output end,
      (2) having apertures defined therein, whereby excess coating from products atop the product transfer pan falls through the apertures,
   b. a chute spaced from the pan and situated below the apertures, whereby the chute receives the excess coating falling through the apertures,
   c. a shaker motor, and
   d. elongated spring arms linking the product transfer pan and chute to the shaker motor, whereby the product transfer pan and chute move with respect to the shaker motor via flexure of the spring arms.

2. The conveyor of claim 1 further including a shaker base:
   a. situated beneath the product transfer pan,
   b. extending about at least a major portion of the perimeter of the conveyor, and
   c. bearing the shaker motor,
   wherein the chute:
   (1) descends within the shaker base, and
   (2) protrudes laterally outwardly from the conveyor past the shaker base.

3. The conveyor of claim 2 wherein the chute protrudes laterally outwardly from the conveyor past the shaker base in a direction oriented at least substantially perpendicular to the product throughput path.

4. The conveyor of claim 1 further including a shaker base:
   a. situated beneath the product transfer pan,
   b. extending about at least a major portion of the perimeter of the conveyor, and
   c. bearing the shaker motor,
   wherein the chute:
   (1) descends within the shaker base, and
   (2) extends outside the shaker base through a passage defined in the shaker base to terminate at a chute output which is not beneath the product transfer pan.

5. The conveyor of claim 4 wherein the chute is spaced from the shaker base by no greater than 3 cm within the passage.

6. The conveyor of claim 1 wherein the apertures are located closer to the conveyor output end than to the conveyor input end.

7. The conveyor of claim 1:
   a. further including a shaker base:
   (1) situated beneath the product transfer pan,
   (2) bearing the shaker motor,
   b. wherein the chute protrudes laterally outwardly from the conveyor:
   (1) in a direction oriented nonparallel to the product throughput path, and
   (2) through a passage in the shaker base.

8. The conveyor of claim 7 wherein the chute is spaced from the shaker base by no greater than 3 cm within the passage.

9. The conveyor of claim 1 wherein the product transfer pan and chute are supported by the spring arms, whereby flexure of the spring arms moves the product transfer pan and chute.

10. A conveyor including:
    a. a frame bearing:
    (1) a product transfer pan:
    (a) configured to convey products thereon along a product throughput path defined between a conveyor input end and a conveyor output end,
    (b) having apertures defined therein,
    (2) a chute situated below at least a majority of the apertures defined in the pan, whereby the chute receives excess coating falling from the products and through at least a majority of the apertures,
    c. a shaker base:
    (1) situated below the frame, and
    (2) bearing a shaker motor,
    d. elongated spring arms linking the shaker base to the frame, whereby flexure of the spring arms moves the frame with respect to the shaker base.

11. The conveyor of claim 10 wherein the chute extends laterally from the conveyor past the shaker base in a direction oriented at least substantially perpendicular to the product throughput path.

12. The conveyor of claim 10 wherein the chute extends laterally through a passage defined in the shaker base to extend outwardly from an outer side of the shaker base.

13. The conveyor of claim 12 wherein the chute is spaced from the shaker base by no greater than 3 cm within the passage.

14. The conveyor of claim 10 wherein the apertures are situated closer to the conveyor output end than to the conveyor input end.

15. The conveyor of claim 10 wherein the weight of the frame is supported by the spring arms.

16. A conveyor including:
    a. a shaker base:
    (1) having opposing base sides extending between opposing base ends, with a base interior situated between the base sides and base ends and an opposing base exterior defining an outer perimeter of the shaker base,
    (2) bearing a shaker motor,
    b. a frame having:
    (1) opposing frame sides extending between opposing frame ends,
    (2) a product transfer pan having:
    (a) a conveyor input end situated adjacent one frame end and an opposing conveyor output end situated adjacent the opposite frame end, with:
    i. a pan length extending parallel to a product throughput path extending between the conveyor input end and the conveyor output end, and
    ii. a pan width defined perpendicular to the product throughput path,
    (b) apertures arrayed across the pan width and along the product throughput path,
    (3) a chute:
    (a) spaced from the pan,
    (b) situated directly below at least a majority of the apertures defined in the pan,
    (c) descending from the frame into the base interior,
    (d) having a chute floor descending to a chute output situated outside the base exterior,
    c. elongated spring arms:
    (1) linking the base sides to the frame sides, and
    (2) supporting the weight of the frame with respect to the shaker base.

17. The conveyor of claim 16 wherein the chute output defines a duct extending through a passage defined in the outer perimeter of the shaker base.

18. The conveyor of claim 16 wherein:
    a. the base sides extend at least substantially parallel to the product throughput path, and
    b. the passage is defined in one of the base sides.

19. The conveyor of claim 18 wherein the chute is spaced from the shaker base by no greater than 3 cm within the passage.

20. The conveyor of claim 16 wherein the apertures are situated closer to the conveyor output end than to the conveyor input end.

* * * * *